United States Patent
Brito et al.

(10) Patent No.: US 6,373,208 B1
(45) Date of Patent: Apr. 16, 2002

(54) SYSTEM FOR VOLTAGE REGULATION OF A VOICE COIL MOTOR

(75) Inventors: Joao Carlos Felicio Brito, Richardson; Frederick W. Trafton, Lewisville; John K. Rote, Addison, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/300,346

(22) Filed: Apr. 27, 1999

Related U.S. Application Data

(60) Provisional application No. 60/083,364, filed on Apr. 28, 1998.

(51) Int. Cl.$^7$ ............................................. H02P 3/12
(52) U.S. Cl. ............... 318/379; 318/375; 360/74.1; 360/75; 360/266.4
(58) Field of Search ................ 318/362–383; 360/74.1, 75, 266.4; 369/43, 44.11

(56) References Cited

U.S. PATENT DOCUMENTS

| | | | | |
|---|---|---|---|---|
| 4,866,554 A | * | 9/1989 | Stupeck et al. | ............. 360/105 |
| 5,087,838 A | * | 2/1992 | Fayfield | ...................... 307/465 |
| 5,091,680 A | * | 2/1992 | Palm | .......................... 318/368 |
| 5,504,402 A | * | 4/1996 | Menegoli | ..................... 318/377 |

* cited by examiner

*Primary Examiner*—David S. Martin
(74) *Attorney, Agent, or Firm*—W. Daniel Swayze, Jr.; W. James Brady; Frederick J. Telecky, Jr.

(57) ABSTRACT

A method is disclosed for controlling the voltage applied to a voice coil motor coil during the retract operations of a mass storage device, comprising a combination of three different voltage regulator stages. This method includes providing a first circuitry stage adapted to source current to a voice coil motor apparatus, raising the voltage across the voice coil motor to a desired level, providing a second circuitry stage adapted to draw current from the voice coil motor effecting a desired voltage across the voice coil motor, and providing a third circuitry stage adapted to raise the voltage of the voice coil motor to ground by effectively shorting the voice coil motor to ground.

2 Claims, 1 Drawing Sheet

SYSTEM FOR VOLTAGE REGULATION OF A VOICE COIL MOTOR

This application claims priority under 35 U.S.C. §119(e)(1) of provisional patent application No. 60/083,364 filed Apr. 28, 1998.

TECHNICAL FIELD OF THE INVENTION

The present invention relates generally to circuitry for voltage regulation within mass storage devices and, more particularly, to a multi-zone voltage regulation system for voice coil motor operation.

BACKGROUND OF THE INVENTION

Circuitry performing voltage regulation is used extensively in modern electronics. Within mass storage devices and electronics, voltage regulation circuitry is commonly used in conjunction with voice coil motors to regulate actuation and retract operations within the storage device. A primary benefit of using voltage regulation during retract operations is that it enables a relatively constant rate of retract to be accomplished.

Conventional methods of regulating voltage during retract operations typically employs circuitry to source current into a voice coil motor. Various complex methods are employed to compensate for existing voltage across the voice coil, which indicates movement of an associated actuator either in or against a desired direction.

As performance and efficiency demands of mass storage devices are increased, voltage regulation associated with retract operations can be optimized to perform with desired operational characteristics. Highly effective and efficient retract operations, capable of operation with low supply voltages, are desirable characteristics of modern storage devices. The effectiveness of retract operations within a storage device is directly related to the efficiency with which current is moved across the voice coil motor, and the ability to move that current in either direction across the voice coil motor. Voltage regulation circuitry can provide these desired operational characteristics.

SUMMARY OF THE INVENTION

Within modern storage devices, voice coil motor circuitry often controls actuator assemblies, used to move signal read/write components across a storage media. As a storage device powers down, retracting the actuator to a fixed position is necessary to prevent damage to the storage media by the read/write components. Because the system is powering down, it is important that retract is operable down to very low voltages. Actuation and retract is most often controlled by a voice coil motor. Voltage across the voice coil is directly related to the direction and magnitude of movement by the actuator. It is possible that once a system power down is signaled within the storage device, the actuator may be moving either in a retract direction or in an opposite actuate direction. Retract operation may be controlled using voltage regulation circuitry to either source or sink current across the voice coil motor, depending on the voltage already present on the voice coil.

In the past, voltage regulators have been used in conjunction with voice coil motors to source current across the voice coil motors. A major problem faced by designers utilizing such voltage regulator configurations was the possibility of an existing voltage across the voice coil motor. If this voltage was such that the actuator was moving in a retract direction, then the voltage regulator circuitry could source current to complete the retract operation. If the actuator was moving in the direction opposite (actuating), having only the ability to source current with the voltage regulator circuitry, the system would have to wait for the existing voltage across the coil to dissipate—indicating the actuator slowed down and stopped—before supplying current to the coil to begin retract operation. This methodology results in differing degrees of ability to regulate the voltage across a coil, in order to get it to move at a fixed rate. This methodology is also inefficient.

Other methods have provided additional voltage regulator circuitry capable of sinking current from the voice coil motor, distinct from the current sourcing circuitry. While this has addressed the ability to alter the voltage across the coil and move the actuator in both directions, it has presented other problems in terms of design overhead and system timing. Such methods present problems and limitations to designers in optimizing system performance, especially during low voltage retract operations. These conventional methods for regulating voltage across the voice coil motor require extra circuitry, are not time efficient, and are not capable of operating at low system voltages.

Further existing methods attempt make no assumptions about the movement of the actuator. These methods stop the actuator regardless of which direction it is moving in, and begin sourcing current to move it in the desired direction. Obviously, a degree of system efficiency is lost when the actuator was already moving in the desired direction before being stopped.

The present invention overcomes the aforementioned limitations of current methods by a system that utilizes existing circuitry within the storage device to perform voltage regulation and provides the ability to source and sink current across the voice coil motor. Additionally the present invention provides the ability to operate at a low system voltage, which is especially important during final retract operation.

The invention provides a method of multi-zone voltage regulation for a voice coil motor during retract operation. Voltage regulator circuitry is provided, comprising three operational systems. Current sourcing circuitry is coupled together with current sinking circuitry and dynamic rectification circuitry to regulate voltage across a voice coil motor. This combination of regulation circuitry provides continuous and optimal regulation the voice coil motor, even during low voltage final retract operations.

BRIEF DESCRIPTION OF THE DRAWINGS

For a more complete understanding of the features and advantages of the present invention, reference is now made to the detailed description of the invention, along with the accompanying figures in which corresponding numerals in the different figures refer to corresponding parts, and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The present invention allows a user to control the voltage applied to a voice coil motor coil, providing optimal performance during a retract operation. Three voltage regulator circuitry systems are employed. These systems utilize existing MOS circuitry within a mass storage device in conjunction with a linear regulator, providing efficient control of a voice coil voltage independent of actual voltage at the coil.

As will be apparent to one skilled in the art, the present invention may be employed with various voltage regulator circuitry. The underlying principle of this invention is applicable, and its implementation readily adaptable, in a wide range of voltage regulation applications. All such embodiments are comprehended by the present invention.

Figure 1:
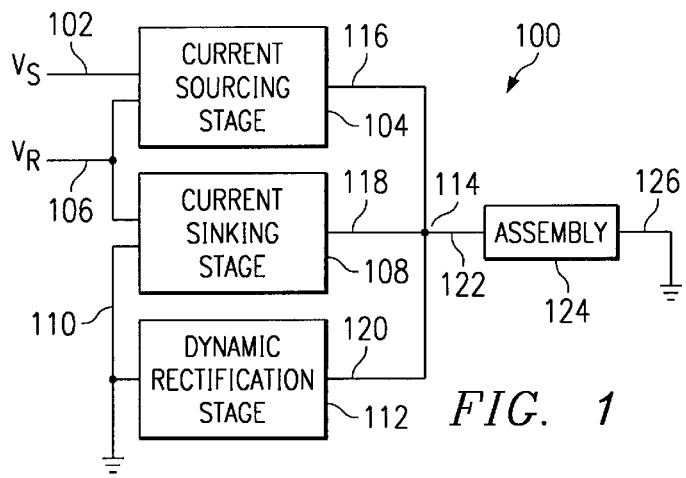
FIG. 1 is an illustrative embodiment of voltage regulation system in combination with a voice coil motor assembly.

Referring now to FIG. 1, an illustrative combination of voice coil motor circuitry and a voltage regulator circuitry 100 is depicted. Supply voltage is coupled by lead 102 to current sourcing stage 104. The supply voltage may be provided by a number of user selectable means. For purposes of illustration, the supply voltage here is provided by a spindle motor within a mass storage device—usually employed to manipulate storage media. A user provided retract voltage signal is coupled by lead 106 to current sourcing stage 104, and to current sinking stage 108. Lead 110 couples current sinking stage 108 and dynamic rectification stage 112 jointly to ground. Stage 104 is coupled to node 114 by lead 116. Similarly, stages 108 and 112 are coupled to node 114 by leads 118 and 120, respectively. Lead 122 connects node 114 to voice coil assembly 124. Assembly 124 is also coupled to ground by lead 126. For purposes of this illustration, the voltage across the voice coil assembly is represented by the voltage as measured at node 114.

As retract operation is initiated, system power within the mass storage device will power down. Supply voltage will be provided from the spindle motor as it spins down. This voltage will obviously continue to decrease over a period of time as the motor comes to a stop. A user provided signal will supply the retract voltage as a reference.

Figure 2:
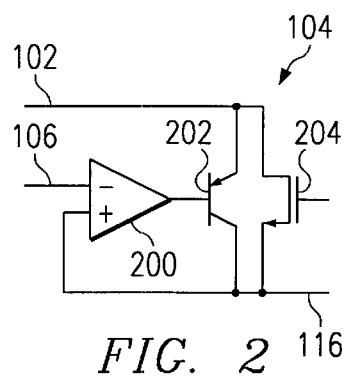
FIG. 2 is an illustrative embodiment of a current sourcing stage of the voltage regulation system depicted in FIG. 1.

Referring now to FIG. 2, an illustrative embodiment of current sourcing stage 104 is depicted. Lead 106 is coupled to one input of amplifier stage 200. The other input of stage 200 is coupled to lead 116. The output of amplifier 200 is coupled to the base of transistor 202. The collector of transistor 202 is coupled to lead 116, and the emitter of transistor 202 is coupled to lead 102. The source of transistor 204 is coupled to lead 116 and the drain of transistor 204 is connected to lead 102.

Figure 3:
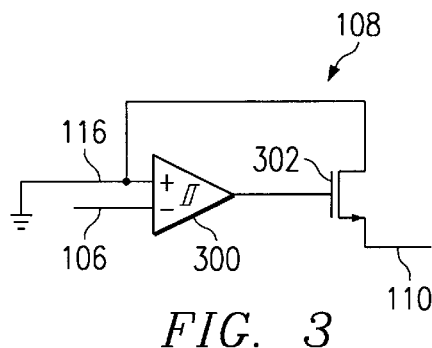
FIG. 3 is an illustrative embodiment of a current sinking stage of the voltage regulator system as depicted in FIG. 1.

Referring now to FIG. 3, an illustrative embodiment of current sinking stage 108 is depicted. Leads 118 and 106 couple to the inputs of amplifier stage 300. The output of amplifier 300 is coupled to the gate of transistor 302. The drain of transistor 302 is coupled to lead 118, and the source of transistor 302 is coupled to lead 110.

Figure 4:
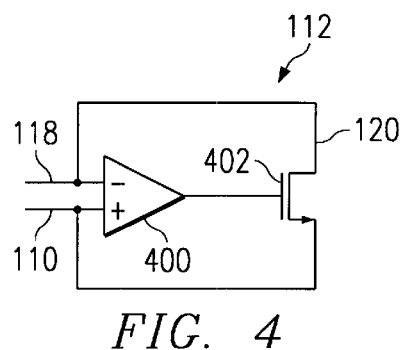
FIG. 4 is an illustrative embodiment of a dynamic rectification stage of the voltage regulator system as depicted in FIG. 1.

Referring now to FIG. 4, an illustrative of dynamic rectification stage 112 is depicted. Leads 110 and 118 are coupled to the inputs of amplifier stage 400. The output of amplifier 400 is coupled to the gate of transistor 402. The source and the gate of transistor 402 are coupled to leads 110 and 118, respectively.

Figure 5:
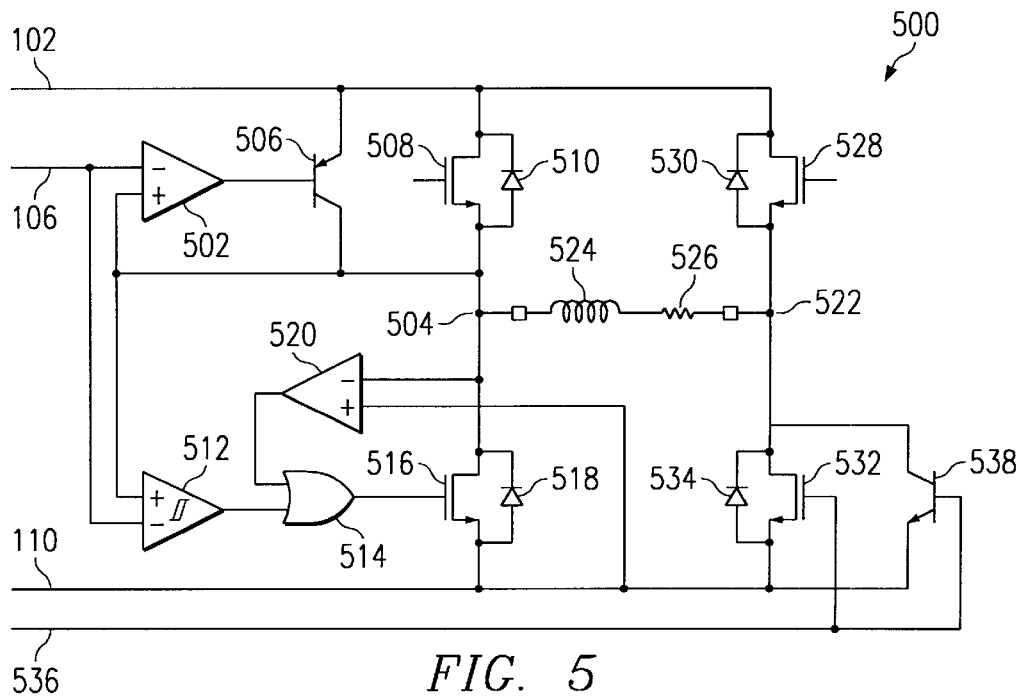
FIG. 5 is an illustrative embodiment of a voltage regulator system in combination with voice coil motor circuitry.

Referring now to FIG. 5, an illustrative embodiment of the system 500 of voltage regulator circuitry previously depicted in FIGS. 1 through 4 in combination with voice coil motor circuitry is depicted. Amplifier stage 502 has a first input coupled to lead 106. A second input of amplifier 502 is coupled to node 504. The output of amplifier 502 is connected to the base of transistor 506. The emitter of transistor 506 is coupled to lead 102, while the collector of transistor 506 is coupled to node 504. Transistor 508 has its source coupled to node 504, while its drain is coupled to lead 102. A first end of diode 510 is coupled to the source of transistor 508, while a second end of diode 510 is coupled to the drain of transistor 508. This diode is merely representative of existing circuitry within a mass storage device and is not critical to the functionality of the present invention. A first input of amplifier stage 512 is coupled to lead 106. A second input of amplifier 512 is coupled to node 504. The output of amplifier 512 is coupled to a first input of OR-gate 514. The output of OR-gate 514 is coupled to the gate of transistor 516. The source of transistor 516 is coupled jointly to lead 110, and to a first end of diode 518. The drain of transistor 516 is coupled jointly to lead 514, and to a second end of diode 518. Again, diode 518 is representative of existing system circuitry and is not critical to functionality. Amplifier stage 520 has a first input coupled to node 504, and a second input coupled to lead 110. The output of amplifier 520 is coupled to a second input of gate 514. Coupled serially between node 504 and node 522 are inductive element 524 and resistive element 526. Transistor 528 has its source coupled jointly to node 522 and to a first end of diode 530. The drain of transistor 528 is coupled jointly to lead 102, and a second end of diode 530. Transistor 532 has its source coupled jointly to lead 110, and a first end of diode 534. The drain of transistor 532 is coupled jointly to node 522 and to a second end of diode 534. The gate of transistor 532 is coupled to lead 536. Transistor 538 has its base coupled to lead 536. The emitter of transistor 538 is coupled to lead 110, and the collector of transistor 538 is coupled to node 522. For purposes of illustration, node 522 is effectively coupled to ground, indicating that the voltage across the voice coil assembly—elements 524 and 526—can be represented as the voltage at node 504.

Functionally, circuit 500 represents one implementation of the voltage regulator system 100 depicted in FIG. 1. Referring again to FIG. 1, if the voltage across the voice coil motor 124, as measured at node 114, is too low, then stage 104 will be operational. Stage 104 will operate to source current through stage 124 to raise the voltage as measured at node 114 to the desired level as supplied on lead 106. If the voltage as measured at node 114 is greater than the desired level, then stage 108 will become operational. Stage 108 will operate to sink current from stage 124, pulling the voltage at node 114 down to a desired level as provided on lead 106. If the voltage at node 114 is lower than ground, then stage 112 will become operational. Stage 112 will operate to short node 114 to ground, pulling the voltage at node 114 up to ground.

Referring back to FIG. 5 now, operation of the voltage regulator system is discussed in greater detail. The first mode of operation assumes that the voltage measured between nodes 504 and 522 is greater than zero but less than the retract voltage signaled on lead 106. During this mode of operation, the voltage regulator system will operate to source current from transistors 506 and 508 through node 504 to raise the voltage across elements 524 and 526 up to the level on lead 106. During this mode of operation, a loop is formed amongst amplifier 502, node 504 and transistors 506 and 508 that effects a voltage regulator providing desired voltage to the voice coil motor stage.

A second mode of operation assumes that the voltage measured between nodes 504 and 522 is greater than the voltage signaled on lead 106. During this mode of operation, amplifier 512 and transistor 516 act to sink current from node 504 through transistor 516—drawing the voltage across the voice coil motor stage down to the desired voltage as signaled on lead 106. In this illustration, amplifier 512 employs switching regulation, reducing the complexity of the required circuitry and improving its efficiency. Because any oscillation associated with the switching of amplifier 512 would be at a very high frequency, such oscillation will not affect system functionality while the system is in final retract operation. During retract operation, the rest of the system components are powered off and noise is not a concern. Node 106 provides a signal to amplifier 512 which turns transistor 516 on. Transistor 516 draws current from node 504, effectively pulling the voltage at node 504 down to a desired voltage level.

A third mode of operation is assumed when the voltage measured between nodes 504 and 522 is lower than ground. During this mode of operation, amplifier 520 and transistor 516 are active, effectively forming an operational amplifier follower circuit with the reference voltage of amplifier 520 tied to ground. This circuitry will then regulate the voltage at node 504, pulling it up to ground. This provides a quick and efficient way to raise the voice coil motor voltage between nodes 504 and 522.

Functionally, the voltage across the voice coil motor stage, as represented between nodes 504 and 522 by elements 524 and 526, will vary with operation of the mass storage device. The voltage on the coil, that is measured at node 504, is proportional to the rate at which voice coil motor is moving the associated actuator. The effectiveness of any retract scheme concerns being able to move currents in either direction, either into or out of the coil, to achieve the desired voltage level across the coil.

The present invention utilizes existing circuitry within mass storage device designs to provide an effective voltage regulation scheme. Further, the method of the present invention provides the ability to operate the voltage regulator circuitry down to a very low supply voltage. As previously noted, during retract operations the supply voltage on lead 102 consistently diminishes.

As will be apparent to those skilled in the art, the embodiments of the voltage regulator system depicted are not exclusive and can be effected using other suitable combinations and elements. While this invention has been described in reference to the illustrative embodiments, this description is not intended to be construed in a limiting sense. Various modifications and combinations of the illustrative embodiments, as well as other embodiments of the invention, will be apparent to persons skilled in the art upon reference to this description. It is, therefore, intended that the appended claims encompass any such modifications or embodiments.

What is claimed is:

1. A method of regulating voltage in a voice coil motor assembly comprising the steps of:

providing a voice coil motor assembly;

providing current sourcing circuitry to source current to raise a voltage on said voice coil motor assembly and coupled to said voice coil motor assembly;

providing current sinking circuitry to sink current to lower said voltage on said voice coil motor assembly coupled to said current sourcing circuitry and to said voice coil motor assembly;

providing dynamic rectification circuitry coupled to said current sourcing circuitry, said current sinking circuitry, and said voice coil motor assembly; and alternatively operating said current sourcing, current sinking and dynamic rectification circuits in three operating modes to maintain said voltage across said voice coil motor assembly.

2. Circuitry for regulating voltage in a voice coil motor assembly comprising:

a supply voltage input;

a desired voltage input;

a voice coil motor apparatus having a first end coupled to ground, and having a second end;

a current sourcing circuitry stage to source current to raise a voltage on said voice coil motor assembly, having a first input coupled to said supply input, having a second input coupled to said desired voltage input, and having an output coupled to said second end of said voltage coil motor apparatus;

a current sinking circuitry stage having a first input coupled to said desired voltage input, having a second input coupled to ground, and having an output coupled to said second end of said voltage coil apparatus;

a dynamic rectification circuitry stage having an input tied to ground and an output coupled to said second end of said voltage coil motor apparatus; and wherein said current sourcing circuitry stage, said current sinking circuitry stage and said dynamic rectification circuitry stage operates in at least three operating modes.

\* \* \* \* \*